Nov. 23, 1954 C. L. KLASING, JR., ET AL 2,694,944
NONSPIN HAND BRAKE MECHANISM
Filed March 5, 1953 2 Sheets-Sheet 1
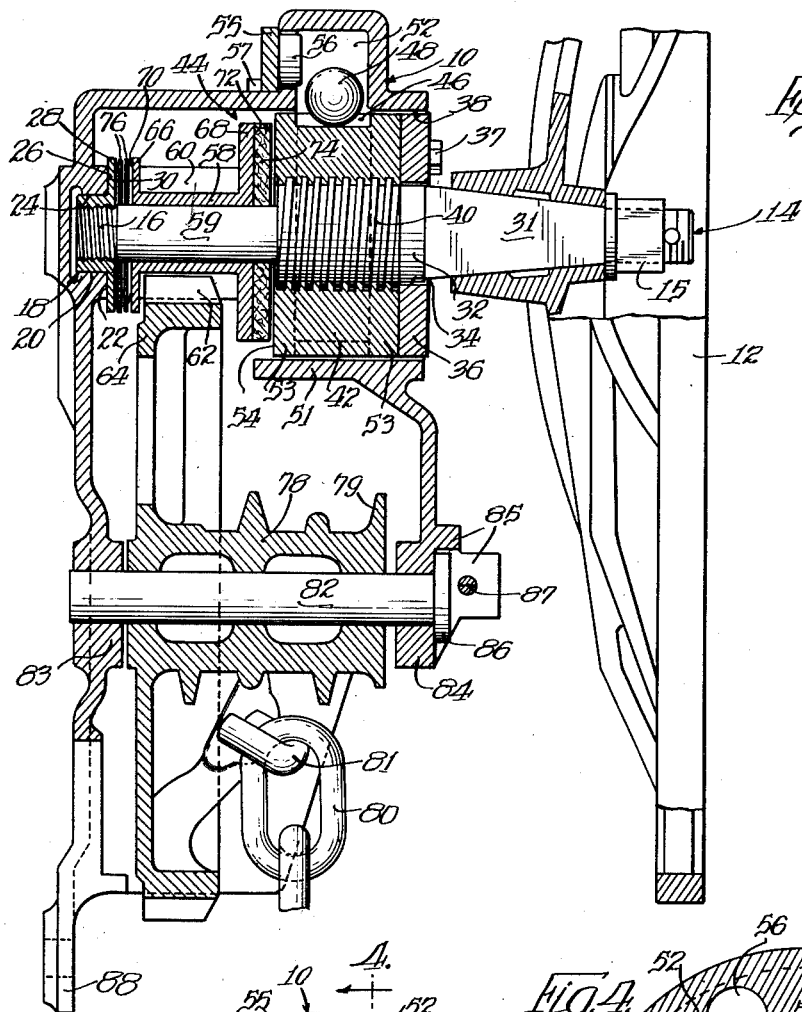
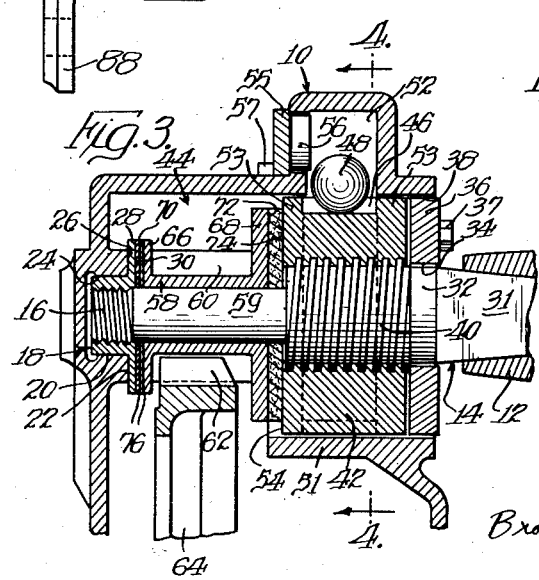
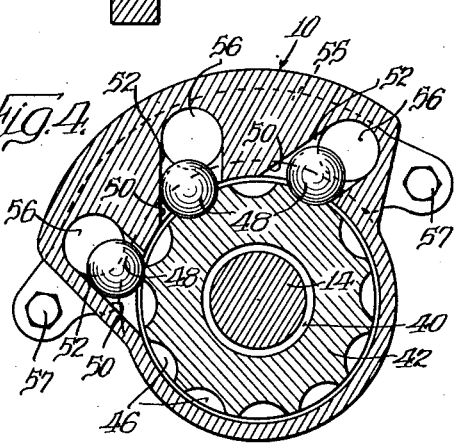
INVENTORS.
Charles L. Klasing Jr.
BY Louis W. Chandler
Brown, Jackson, Boettcher & Dienner
Attys.

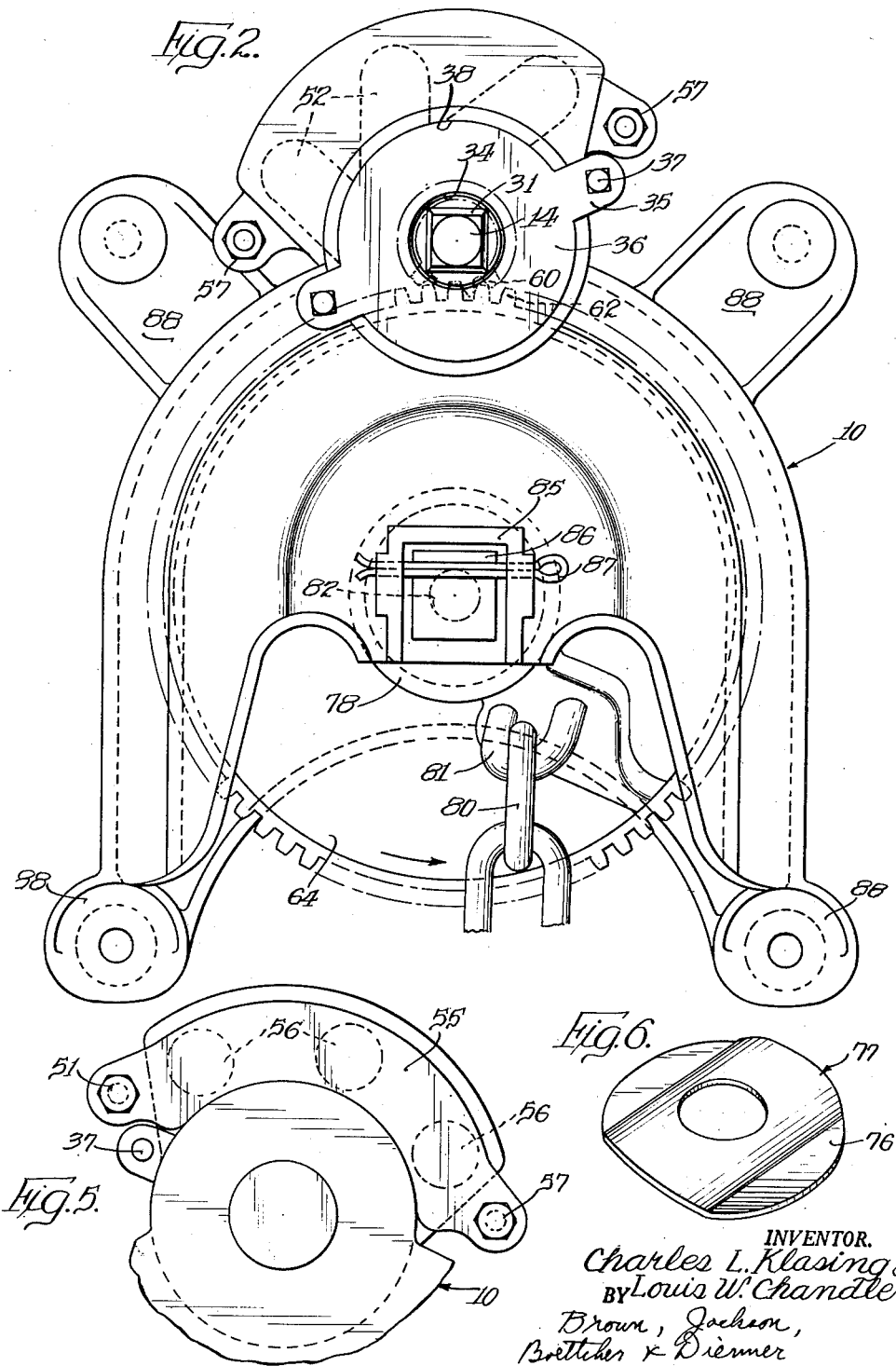

United States Patent Office 2,694,944
Patented Nov. 23, 1954

2,694,944

NONSPIN HAND BRAKE MECHANISM

Charles L. Klasing, Jr., and Louis W. Chandler, Joliet, Ill., assignors to Klasing Hand Brake Company, Joliet, Ill., a corporation of Illinois.

Application March 5, 1953, Serial No. 340,514

9 Claims. (Cl. 74—505)

This invention pertains to hand brake mechanisms and, more particularly, to hand brake mechanisms of the non-spin type adapted for railway cars.

Hand wheels of a known type which, upon initial release of the brake, are then rapidly spun by the movement of the brake mechanism itself during further releasing of the brake, may be dangerous to the user and to the brake mechanism itself. The spinning wheel may throw the user off balance, catch and injure his arm, or hit him with a club which is sometimes used in initially turning the wheel to release the brake, or may hurl the club free from the wheel and the user and hit some other object or person. Also, the release of such brake mechanism may be so explosive in character as to damage or destroy the air brake pistons.

In railway car braking mechanisms a hand brake wheel which is truly non-spin is, therefore, very desirable, since it is safer and more convenient to use. It provides for release of the brake mechanism without having the brake mechanism spin the hand brake wheel. The user is enabled to control the degree and speed of release of the brake.

One form of railway brake mechanism presently employed, and sometimes referred to as a "non-spin hand brake mechanism," provides a chain-winding drum fixed to a gear wheel with the gear wheel engaging with a pinion which is rotatably mounted on a shaft which carries a hand wheel at its outer end. The brake is engaged by rotating the hand wheel in one direction a substantial amount first to clutch the pinion to the shaft and then to wind up the chain on the drum through the action of the pinion on the gear for the drum. When it is desired to release such brake mechanism, the hand wheel is rotated in the opposite direction a substantial amount first to unclutch the pinion from the shaft, whereupon the weight of the movable portions of the brake mechanism, including the chain, start to rotate the drum. Such rotation of the drum through its gear wheel then acts on the pinion to reclutch the pinion to the shaft and to reset the brake. While the hand wheel is not itself rotated by the releasing of the brake mechanism—and to that extent might be called "non-spin"—nevertheless, it must continue to be manually rotated a substantial number of turns during release of the brake mechanism in order for the brake not to reset itself automatically.

It is an object of this invention to provide a truly non-spin hand brake mechanism which will permit the user to partially release or fully release the brake, in an amount and at a speed selected by the user without the necessity for continuously rotating the hand brake wheel.

It is a further object of this invention to permit partial release of the brake mechanism by a very small arc of movement of the hand brake wheel and to provide full release by less than one turn of the hand brake wheel.

It is a further object to provide mechanism accomplishing the foregoing objects wherein the only structure required to be handled by the user is the hand wheel itself.

It is yet another object of the invention to provide an improved form of clutching mechanism by which the pinion, which is in engagement with the gear wheel of the chain winding drum, may be clutched to the operating shaft and hand wheel.

It is still another object of this invention to provide a structure which will positively prevent release of the brake mechanism unless and until the user employs the hand wheel to release the brake.

Another object of the invention is to provide a non-spin hand brake incorporating spring clutch means whereby a graduated clutch release is attained to accommodate a gradual release of the brakes.

A further object of the invention is the provision of novel spring clutch elements for hand brakes.

A still further object of the invention is the provision of an improved hand brake mechanism wherein the components of the mechanism are readily assembled and disassembled to accommodate ready repair and replacement of parts and, particularly, to accommodate repair of the mechanism in the position that the same is mounted for use.

Other objects, uses and advantages of the invention will become apparent, or be obvious, from a consideration of the following description, when taken with the drawings, in which:

Figure 1 is a vertical sectional view of that portion of the hand brake mechanism which illustrates our invention and which is mounted at the end of a railway car, normally vertically as shown, the position of the mechanism corresponding to a released position of the car brake shoes;

Figure 2 is a front elevation of the hand brake mechanism with the brake wheel removed;

Figure 3 is a partial sectional view showing the brake mechanism of Figure 1 in a position corresponding to the braking, or set, position of the car brake shoes;

Figure 4 is a sectional view taken substantially on the line 4—4 of Figure 3;

Figure 5 is a partial rear elevation of the upper portion of the hand brake mechanism; and Figure 6 is a perspective view of the novel spring clutch element of our invention.

Turning now to Figure 1 of the drawings, wherein the position of the brake mechanism corresponds to released position of the brake shoes (not shown), there is shown a housing, indicated generally by the reference numeral 10, and a hand wheel 12 which is fixed to a rotatable operating member or shaft, indicated generally by the reference numeral 14, by means of a nut 15 threaded to the free end of the shaft. At the opposite end of the shaft 14 from the wheel 12 the shaft is threaded, as at 16, and carries a collar, indicated generally by the reference numeral 18. The collar 18 provides bearing surfaces 20 and 22, which, respectively, are carried in a cylindrical bearing surface 24 and abut against a plane bearing surface 26 provided by the housing 10. The bearing surface 22 is formed on one side of a flange 28 of the collar 18 and the other side of the flange provides a clutch face 30 for a purpose to be described more fully hereinafter. As the description proceeds, it will become apparent that the flange 28 and face 30 comprise an abutment or limiting means fixed to the shaft 14. Accordingly, it will be appreciated that the collar 18 with its flange and bearing surfaces might be formed as an integral portion of the shaft 14.

Shaft 14 provides a tapered portion 31 of square cross-section, on which the hub of the hand wheel 12 seats, and a straight portion 32 which is adapted to pass through an aperture 34 provided in a closure plate 36 which is removably secured in a generally circular opening 38 in the front of the housing 10. As is shown in Figure 2, the closure plate 36 is generally annular but includes a pair of radially extending tabs 35, the plate being detachably secured to the housing 10 by means of bolts or studs 37 passing through the tabs 35 and threadedly secured to the housing. Axially adjacent the straight portion 32 the shaft 14 has a helically threaded portion 40, with which threaded portion the hub 42 of a clutch mechanism, indicated generally by the reference numeral 44, has a threaded connection. As may be better seen in Figure 4, the hub 42 of the clutch has a plurality of equally spaced, axially extending, semi-circular depressions 46 about its periphery adapted for the reception of a plurality of balls 48 or like clutch or detent members or elements. In use, the balls 48 are adapted to be engaged between the hub 42 and cam surfaces 50 of recesses 52 which are formed in the wall of the housing 10. The spacing of the depressions 46 of the hub with respect to the cam surfaces 50 of the recesses 52 is such that there is always at least one ball in a depression ready for engagement with, or in engagement with, a cam surface 50 to prevent the hub from rotating counterclockwise, as viewed in Figure 4. If the hub 42 is rotated in a clockwise direction, the movement of the hub will drive the rollers outwardly into the recesses 52 and permit the clockwise rotation, with a dragging action being provided against the periphery of the hub 42 by the balls 48. To the opposite sides of the recesses 46 and 52, the hub 42 presents a pair of circumferentially continuous flange portions 53 which are journalled in a cylindrical boss 51 provided in the housing 10 to provide a bearing for the hub and a firm support for the forward end of the shaft 14. The end face or surface 54 (see Figures 1 and 3) of the hub 42 of the clutch 44 is a friction clutch face for a purpose to be described below.

To accommodate ready insertion and removal of the balls 48 from their respective recesses 52, bores are formed in the housing 10 communicating with each of the recesses. The said bores are closed by means of a common plate 55 having a plurality of cylindrical tenons 56 thereon adapted to fit into the bores. The plate 55 is detachably secured to the housing 10 by means of bolts 57 extending through the plate 55 and through tabs provided on the housing.

Shaft 14 also provides a bearing surface 59 on which a pinion 58 is adapted to be freely mounted for rotation and for movement axially of the shaft 14. Pinion 58 has its teeth 60 engaged with the teeth 62 of a spur gear 64 and at opposite ends of the pinion 58 there are formed flanges 66 and 68 which, preferably, are of a diameter greater than the diameter across the teeth of the pinion 58. Thus, the pinion 58 is generally spool-like in form. The outer surfaces 70 and 72, respectively, of the flanges 66 and 68 of the pinion 58 provide clutch faces. While it would be possible for the friction clutch face 54 of the hub 42 of the clutch 44 and the friction clutch face 72 of flange 68 on pinion 58 to engage directly, it is preferred to employ a friction clutch disc or plate 74 between them. The friction clutch disc 74 may be freely mounted on the shaft 14, or it might be carried either on clutch face 54 of hub 42 or face 72 of flange 68 of pinion 58. In the case of the clutch surfaces or faces 30 and 70 at the opposite end of the pinion 58, however, we employ spring clutch elements 76 between the two faces to accommodate and provide a gradual clutch release.

One of the spring elements 76 is shown in detail in Figure 6 as comprising an annular metallic washer having a substantial portion thereof bowed, the bow being in one direction only as is clearly shown at 77. In use, two such washers or spring elements are utilized with the convex portions of the same being disposed in abutting relation. Thus, the washers provide a resilient or spring clutch means between the clutch faces 30 and 70 for a purpose to be described hereinafter.

Spur gear 64 is connected integrally with a chain-winding drum 78, which drum presents a generally helical chain guiding flange member 79. The drum, when rotated, is adapted to wind up the chain 80, which is secured to an enlargement on the gear 64 and drum 78 by a U-bolt 81, to operate other portions of the brake mechanism (not shown) to apply the brake shoes (not shown) to the wheels of the railway car in a known manner. The gear 64 and drum 78 are rotatably mounted on a shaft 82 which is mounted in the housing 10 for ready detachment. As shown, the housing 10 is provided in the back wall thereof with a boss 83 having a bore adapted for the free reception of the shaft 82. A similar boss 84 is provided in the front wall of the housing to support the other end of the shaft. To the outside thereof adjacent the boss 84, the front wall of the housing 10 is provided with a generally box-like formation of walls 85 forming a recess for the reception of a square head 86 provided on the shaft 82. The shaft is adapted to be detached by sliding movement through the front wall of the housing, the same normally being retained in assembled relation by a cotter key 87 passed through the walls 85 over the end of the head 86 of the shaft 82. As will be appreciated, the housing 10 is adapted to be secured to a vertical wall of a railroad car by means of fasteners extending through the mounting brackets or tabs 88.

The hand brake mechanism of the present invention is so constructed and arranged as to accommodate ready assembly and disassembly of the components of the mechanism even after the housing is mounted on a vertical wall of a railroad car. To this end, the housing 10 is provided at the bottom thereof with a wide opening accommodating passage of the spur gear 64 and winding drum 78, the shaft 82 is freely slidable with respect to the bosses 83 and 84 and the gear 64 and drum 78, and the clutch mechanism 44 is freely slidable with respect to the cylindrical boss 51 and the bearing surface 24. Assuming that mechanism to be mounted on a vertical wall of a railroad car, disassembly of the mechanism for repair or overhauling is as follows: The hand wheel 12 is rotated counterclockwise as the same would be viewed with respect to Figure 2 to uncouple the pinion 58 with respect to the shaft 14 whereupon the chain 80 and the brake mechanism of the railroad car are slacked off. The chain 80 is then uncoupled from the car brake mechanism and the hand wheel 12 is removed from the shaft 14 upon removal of the nut 15. The cotter key 87 is removed from the box walls 85 to free the shaft 82. Thereafter, the operator or repair man inserts one hand into the open bottom of the housing to grip the gear 64 and with the other hand slides the shaft 82 through the front wall of the housing whereupon the gear 64 and drum 78 may be lowered through the bottom of the housing. To disassemble the clutch mechanism 44, the closure plate 36 is removed upon removal of the bolts or studs 37. The operator or repair man then rotates the shaft 14 in a clockwise direction as the same is viewed in Figure 2 until actuation of the balls 48 occurs, which fact is audibly noticeable. Then, by simultaneous rotation and pulling, both of a minor order, the clutch mechanism may be slid forwardly of the housing, the slight rotary movement effecting disengagement of the balls 48 from the recesses or depressions 46. As the shaft 14 is slid forwardly, the operator or repairman inserts one hand into the interior of the housing, palm up, and as the hub 42 clears the recesses 52, the balls 48 will fall into his hand. Thereafter, the clutch mechanism, comprising the shaft 14, hub 42, pinion 58, collar 18, clutch elements 76 and friction clutch disc 74, is removed. To complete the disassembly, the plate 55 is removed upon removal of the bolts 57.

To reassemble the device, the clutch mechanism 44 is slid into the housing until the collar 18 is journalled in the bearing surface 24 and hub 42 is journalled in the cylindrical boss 51. The balls 48 are then inserted into their respective recesses through the bores communicating with such recesses and the plate 55 is bolted to the housing with the tenons 56 entering into and closing the bores. The closure plate 36 may then be bolted in place to retain the clutch mechanism in the housing. Thereafter, the unitary assembly of the gear 64 and drum 78 is inserted through the bottom of the housing and the shaft 82 is slid into place and retained therein by reassembly of the cotter key. The hand wheel may then be secured to the shaft 14 and the chain 80 is again connected to the railroad car brake mechanism to complete the assembly.

The operation of the hand brake mechanism of our invention is as follows: When it is desired to apply the railroad car brakes, the hand wheel 12 is rotated so that it and the shaft 14 rotate in a clockwise direction, as viewed in Figures 2 and 4. At that time, the pinion 58 is unclutched from shaft 14 and consequently is not driven and does not drive the spur gear 64 to which the chain-winding drum 78 is connected. The chain 80 is unwound from the drum and assumes a slack condition. Rotation of the shaft 14 in the clockwise direction, by reason of the pitch of the threads on its threaded portion 40, tends to rotate the hub 42 of the clutch 44 with it in the clockwise direction. However, the tendency of hub 42 to rotate with shaft 14 and wheel 12 is interfered with by the drag of the balls 48 of the clutch mechanism 44. The drag caused by the balls tends to hold the hub 42 against rotation to some degree and consequently there is relative rotation between the shaft 14 and the hub 42. By reason of the hub's threaded connection with shaft 14, the hub 42 will have relative movement axially to the left, as viewed in Figure 1.

Relative movement of hub 42 to the left as viewed in Figure 1, brings the friction clutch face 54 of the hub against the friction clutch disc 74 and presses it and the pinion 58 to the left, whereupon the clutch face 70 of flange 66 on pinion 58 is pressed against the spring clutch elements 76 which are then pressed against the clutch surface 30 of flange 28 on the collar 18 to effect a slight initial compression of the elements 76. In this manner, an initial clutching bias is exerted on the pinion 58 to couple the pinion to the shaft 14 whereupon the pinion 58 rotates with the wheel 12 and shaft 14 in a clockwise direction and, in turn, imparts initial driving movement to the spur gear 64 and the chain-winding drum 78 in a counterclockwise direction to commence winding the chain 80 on the drum. As was pointed out, when the hand wheel 12 is first rotated in a clockwise direction to take up the slack in the chain 80, the balls 48 create a drag which accommodates initial compression of the spring elements 76 and an initial clutching of the pinion to the shaft, the friction hold on the pinion by the elements 76 and disc 74 being sufficient to overcome the weight of the chain and associated apparatus. Thereafter, rotation of the shaft 14 and hub 42, due to the frictional lock-up of the same to the shaft through the pinion 58, effects ratcheting of the balls 48 in their recesses to accommodate such rotation. Should the hand wheel be released at any time, at least one of the balls will engage in one of the recesses 46 in the hub 42 to prevent reverse rotation of the shaft, hub and handwheel.

As the slack is taken out of the chain 80, the brake mechanism to which the same is connected imposes a further load on the pinion 58. Such load in effect acts as a brake on the pinion, the clutch disc 74 and the hub 42 so that further rotation of the hand wheel 12 effects further compression of the spring elements 76 due to relative axial movement of the hub 42 in the manner described. As the elements 76 are compressed, the frictional load on the pinion 58 is increased to overcome the load imposed by the railroad car brake mechanism. Thus, during continued rotation of the hand wheel 12, there will be alternating periods of increasing the compression of the spring elements 76 and of rotating the pinion 58 and gear 64 to wind the chain 80 on the drum 78, winding of the chain being guided by the helical flange 79.

As the chain is wound up on the drum, the brake shoes are applied to the brakes of the railway car. When the brakes are set, or at any intermediate point when the brakes are being applied, the hub 42 of the clutch 44 is prevented from rotating in a counterclockwise direction by reason of one or more of the balls 48 then being driven against a cam surface 50, the wedging action of the ball between the cam surface and the hub stopping the counterclockwise rotation. Consequently, the balls 48 and hub 42 form a one-way ratchet mechanism and the brake is not released by loosening one's grip on wheel 12.

When the brake is set, the weight of the lower portions of the braking mechanism (not shown) and the force on the car brakes have a tendency to rotate the spur gear 64 in the opposite (clockwise) direction from which it was rotated while the brakes were being applied. Such unwinding rotation of the spur gear would tend to rotate the pinion 58 in a counterclockwise direction, but, as explained above, since pinion 58 is clutched to shaft 14, the shaft and hub 42 would then also tend to be rotated in a counterclockwise direction, a direction of rotation which is impossible, since the wedging action of the clutch 44 prevents it and, consequently, the brake is not released even though the hand wheel is not held by the user.

As will be appreciated from the above description of the operation of the spring clutch elements 76, the application of the railway car brakes may be effected gradually. However, the amount of rotation required of the hand wheel 12 to apply the brakes is very slight, so that the brakes may be applied rapidly. For example, in one commercial embodiment, the handle wheel is rotated one and one-half times to effect clutching of the pinion 58 to the shaft 14 from a position in which the pinion is freely rotatable on the shaft. Approximately four and one-half turns will then take up the slack in the chain 80 and the brake mechanism. Thereafter, each quarter turn of the hand wheel will effect an application of approximately 500 pounds to the car brake mechanism. In practical design, the mechanism of the present invention is preferably such as to effect an application of approximately 4000 pounds pressure to the car brake mechanism. The position of the mechanism corresponding to full application of the brakes is shown in Figure 3, wherein the spring clutch elements are substantially fully compressed.

When the brake is to be released, it is only necessary for the user to rotate the hand wheel 12 and shaft 14 in a counterclockwise direction a small amount. The degree of release and speed of release are entirely under the control of the user and the releasing portions of the brake mechanism do not and cannot drive the wheel 12 when the brake is being released. For example, the user may release the brake very gradually by incremental turns of the wheel, or may release it quickly, from 4000 pounds to zero in the embodiment referred to above, by less than one turn of wheel 12. To effect complete release, that is, free wheeling of the pinion 58, the wheel 12 need be rotated only one and one-half turns further.

The manner in which the brake mechanism is operated in releasing the car brakes will now be more fully described. The user will first rotate the hand wheel 12 a slight amount in a counterclockwise direction. The hub 42 would normally tend to rotate with the shaft 14 by reason of the pitch of the threads 40 of the shaft 14, but the balls 48 prevent counterclockwise rotation (that is, rotation in a direction away from the braking engagement position). Consequently, the hub portion 42 is threaded axially to the right, as viewed in Figure 3, whereupon the pressure exerted between the frictional clutch face 54 of hub 42 and the friction disc 74 and clutch face 72 of flange 68 of pinion 58, along with the pressure exerted between the clutch face 70 of flange 66 of pinion 58 and the clutch elements 76 and surface 30 of collar 18, is relieved. The force on the brakes, which is constantly acting to rotate the spur gear 64 in a clockwise direction (which will rotate the pinion in a counterclockwise direction), then overcomes to a certain extent the frictional engagement provided by the clutch mechanism and the chain unwinds slightly to reduce the pressure on the brakes. The speed and degree of release is entirely under the control of the user, who will rotate the wheel 12 in a counterclockwise direction in an amount corresponding to the degree and speed of release desired. The spring clutch elements 76 accommodate a gradual or rapid release of the brakes, and a gradual or rapid brake application so that the user can vary the speed and degree of release and at any time can reapply the brakes or a portion of the load on the brakes as desired. In practical usage, oscillation of the wheel 12 through a very short path will give the user full control of the car. In either releasing or applying the brakes, the large hand wheel 12 and the gear ratio of the pinion 58 and gear 64 will provide the user with a substantial mechanical advantage, so that the mechanism is easily operated.

From this it will be seen that complete control over both the application and release of the brake is provided for the user of the braking mechanism of our invention and there is no danger to the user from the hand wheel being driven by the releasing brake mechanism. Also, there is no danger of the braking mechanism suddenly releasing in an explosive manner with possible damage to the air brake pistons.

From the foregoing, it will be appreciated that the device of the present invention, particularly the mechanism 44, has characteristics of both a clutch and a brake. The means for coupling the pinion 58 to the shaft 14 is truly in the nature of a clutch, but the ratchet provided by the balls 48 more closely simulates a brake. For purposes of clarity herein, the whole device is referred to as a hand brake, or braking mechanism, since its purpose is to control the brakes of a railway car, and the mechanism 44 is referred to as a clutch since this is its primary purpose and, also, to distinguish the same from the overall device and the railway car brakes.

While we have illustrated a preferred embodiment of our invention, we do not intend to be limited thereto, except insofar as the appended claims are so limited, since certain changes and modifications coming within the scope of the invention will occur to those skilled in the art by reason of our disclosure.

We claim:

1. For use in a non-spin hand brake mechanism, in combination, a manually rotatable operating member, a pinion freely mounted on said operating member, a clutch mechanism including a hub portion which has a threaded connection with said member and comprises one element for clutching with said pinion, and spring clutch means between said member and said pinion, said operating member when rotated in one direction moving the hub of the clutch mechanism into clutching engagement with said pinion and effecting compression of said spring clutch means to couple said shaft and said pinion and apply the brake mechanism and when rotated in the opposite direction from clutching position providing selective variations in the speed of disengagement of the braking mechanism in accordance with the amount of rotation of said member in said opposite direction, said clutch mechanism preventing rotation of said hub in said opposite direction.

2. For use in a non-spin hand brake mechanism, in combination, a manually rotatable operating member, a pinion freely mounted on said operating member, means limiting axial movement of said pinion in one direction, a clutch mechanism including a hub portion which has a threaded connection with said member and comprises one element of a clutch for clutching with said pinion, a pair of clutch means, one disposed between the hub of the clutch mechanism and the pinion and the other disposed between the pinion and said limiting means, one of said clutch means comprising compressible spring means, said operating member when rotated in one direction moving the hub of the clutch mechanism into clutching engagement with said pinion and effecting compression of said spring means to couple said shaft and said pinion and apply the brake mechanism and when operated in the opposite direction from the clutching position providing selective variations in the speed of disengagement of the braking mechanism in accordance with the amount of rotation of said member in said opposite direction, said clutch mechanism preventing rotation of said hub in said opposite direction.

3. For use in a non-spin hand brake mechanism, in combination, a rotatable shaft, a pinion freely mounted on said shaft, a pair of radially extending flanges on opposite ends of said pinion with each flange providing a clutch face, means connected with said shaft and providing a clutch face adapted to cooperate with the clutch face on one flange of said pinion, a clutch mechanism including a hub portion which has a threaded connection with said shaft, said hub portion having a clutch face adapted to cooperate with the clutch face on the other flange of said pinion, and a compressible spring clutch means disposed between a pair of said clutch faces, said shaft when rotated in one direction being adapted to cause said hub portion to move axially toward and into operative engagement with said pinion and to compress said spring clutch means, whereby the clutch faces are all operatively engaged and said pinion is clutched to the shaft for rotation therewith, said clutch mechanism preventing rotation of said hub portion in the opposite direction.

4. The combination of claim 3 wherein the diameters of the flanges on said pinion are greater than the diameter across the teeth of said pinion.

5. For use in a non-spin hand brake mechanism having a housing and a brake operating gear rotatable in the housing, a clutch mechanism comprising a shaft, a spool-like pinion journaled on said shaft, a hub threaded to said shaft to one side of said pinion, said shaft presenting an abutment to the other side of said pinion, said hub and shaft being adapted to be journaled in the housing with said pinion meshing with the brake operating gear, means adapted to cooperate with the housing and said hub and define a one-way ratchet mechanism therebetween, said hub and said pinion and said abutment and said pinion presenting opposed clutch faces, and spring clutch means confined between one pair of said opposed clutch faces, the drag of said ratchet mechanism means and the load on the brake operating gear normally tending to retain said hub stationary upon rotation of said shaft in the direction in which rotation of said hub is accommodated, the threaded connection between said shaft and said hub being adapted to effect axial movement of said hub upon rotation of said shaft in said direction to move said hub toward said pinion and to effect compression of said spring clutch means to couple said pinion, said shaft and said hub with variable coupling force whereupon rotation of said shaft is adapted to effect rotation of said hub, said pinion and the brake operating gear, said ratchet mechanism means preventing rotation of said hub in the opposite direction whereby rotation of said shaft in said opposite direction is adapted to effect axial movement of said hub away from said pinion to accommodate uncoupling of said pinion and said shaft and release of the brake operating gear.

6. For use in a non-spin hand brake mechanism having a housing and a brake operating gear rotatable in the housing, a clutch mechanism comprising a shaft, a pinion journaled on said shaft, a hub threaded to said shaft to one side of said pinion, said hub and shaft being adapted to be journaled in the housing with said pinion meshing with the brake operating gear, means adapted to cooperate with the housing and said hub and define a one-way ratchet mechanism therebetween, said hub and said pinion having opposed clutch faces, and spring clutch means confined between said shaft and said pinion to the side of said pinion opposite said hub, the drag of said ratchet mechanism means and the load on the brake operating gear normally tending to retain said hub stationary upon rotation of said shaft in the direction in which rotation of said hub is accommodated, the threaded connection between said shaft and said hub being adapted to effect axial movement of said hub upon rotation of said shaft in said direction to move said hub toward said pinion and to effect compression of said spring clutch means to couple said pinion, said shaft and said hub with variable coupling force whereupon rotation of said shaft is adapted to effect rotation of said hub, said pinion and the brake operating gear, said ratchet mechanism means preventing rotation of said hub in the opposite direction whereby rotation of said shaft in said opposite direction is adapted to effect axial movement of said hub away from said pinion to accommodate uncoupling of said pinion and said shaft and release of the brake operating gear.

7. For use in a non-spin hand brake mechanism having a housing and a brake operating gear rotatable in the housing, a clutch mechanism comprising a shaft, a spool-like pinion journaled on said shaft, a hub threaded to said shaft to one side of said pinion, said shaft presenting a flanged abutment to the other side of said pinion, said hub and shaft being adapted to be journaled in the housing with said pinion meshing with the brake operating gear, means adapted to cooperate with the housing and said hub and define a one-way ratchet mechanism therebetween, said hub and said pinion and said abutment and said pinion presenting opposed clutch faces, a friction disc confined between the clutch faces of said pinion and said hub, and a pair of spring clutch elements confined between said abutment and said pinion, the drag of said ratchet mechanism means and the load on the brake operating gear normally tending to retain said hub stationary upon rotation of said shaft in the direction in which rotation of said hub is accommodated, the threaded connection between said shaft and said hub being adapted to effect axial movement of said hub upon rotation of said shaft in said direction to move said hub toward said pinion to effect engagement of said pinion and said hub with said friction disc and to effect compression of said spring clutch elements to couple said pinion, said shaft and said hub with variable coupling force whereupon rotation of said shaft is adapted to effect rotation of said hub, said pinion and the brake operating gear, said ratchet mechanism means preventing rotation of said hub in the opposite direction whereby rotation of said shaft in said opposite direction is adapted to effect axial movement of said hub away from said pinion to accommodate uncoupling of said pinion and said shaft and release of the brake operating gear, rotation of said shaft in said opposite direction effecting only a release of said pinion with respect to said shaft and said hub, whereby partial or complete release of said pinion and the brake operating gear is accommodated by a fractional turn of said shaft.

8. A hand brake mechanism comprising a housing having front, rear and top walls and an open bottom, said housing having a pair of vertically spaced apertures in the front wall thereof, a brake operating unit insertable through the open bottom of said housing, said unit including a gear, a chain winding drum and a chain depending through the open bottom of said housing, a shaft slidable through the lower aperture in the front wall of said housing and said gear and into the rear wall of said housing, said gear and drum being freely journaled on said shaft, a clutch mechanism slidable through the upper aperture in the front wall of said housing and journaled in said housing in spaced parallel relation to the said shaft, a first detachable closure plate for retaining said clutch mechanism in said housing, said clutch mechanism including a pinion adapted to mesh with said gear and a ball type one-way ratchet mechanism, said housing having recesses in the top wall thereof for the reception of the balls of said ratchet mechanism, and a second detachable closure plate for said recesses, said shaft being slidable through said gear and drum and through the front wall of said housing to accommodate lowering of said brake operating unit through the open bottom of said housing, said clutch mechanism being slidable through the front wall of said housing upon removal of said gear and detachment of said first closure plate, said second plate being detachable to accommodate reassembly of said balls in said recesses after reassembly of said clutch mechanism, said brake operating unit and said shaft in said housing, whereby the brake mechanism is adapted to be assembled and disassembled when mounted for use.

9. A hand brake mechanism comprising a housing having an open bottom, a brake operating gear insertable through the open bottom of said housing, a shaft detachably mounted on said housing, said gear being freely journaled on said shaft, a clutch mechanism journaled in said housing and detachable with respect thereto, said clutch mechanism including a manually rotatable operating member, a pinion freely mounted on said operating member, said pinion being adapted to mesh with said gear, means limiting axial movement of said pinion in one direction, a one-way ratchet mechanism including a hub portion which has a threaded connection with said operating member and comprises one element of a clutch for clutching with said pinion, a pair of clutch means, one disposed between the hub of the ratchet mechanism and the pinion and the other disposed between the pinion and said limiting means, one of said clutch means comprising compressible spring means, said operating member when rotated in one direction moving the hub of said ratchet mechanism into clutching engagement with said pinion and effecting compression of said spring means to couple said shaft and said pinion and rotate said gear and when rotated in the opposite direction from the clutching position providing selective variations in the speed of disengagement of the braking mechanism in accordance with the amount of rotation of said member in said opposite direction, said ratchet mechanism preventing rotation of said hub in said opposite direction, said ratchet mechanism including detent members, said housing having recesses therein for the reception of said detent members, and a detachable closure plate for said recesses, said shaft being detachable from said housing to accommodate lowering of said gear through the open bottom of said housing, said clutch mechanism being detachable from said housing upon removal of said gear, said closure plate being detachable to accommodate reassembly of said detent members after reassembly of said clutch mechanism and said gear in said housing.

References Cited in the file of this patent

UNITED STATES PATENTS

| Number | Name | Date |
|---|---|---|
| 1,984,071 | Liebreich | Dec. 11, 1934 |
| 2,166,201 | Van Cleave | July 18, 1939 |
| 2,267,037 | Mersereau | Dec. 23, 1941 |